April 30, 1968 E. ARENDS 3,381,186
BALANCED MULTIPLE CONTACT CONTROL ELECTRODE
Filed March 19, 1965
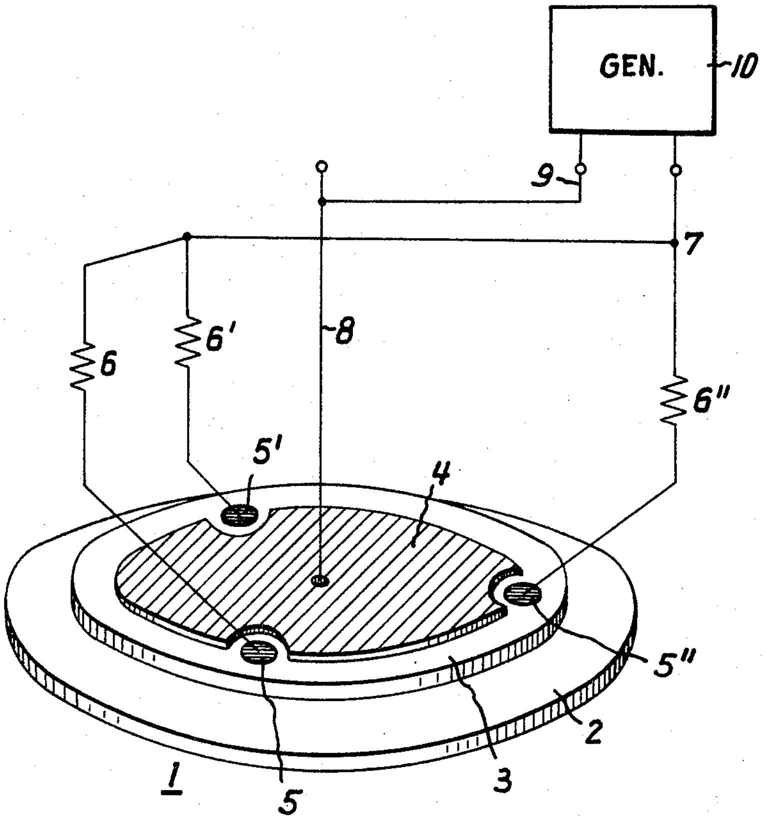
Inventor:
Enno Arends
By: Spencer & Kaye
Attorneys United States Patent Office 3,381,186

Patented Apr. 30, 1968

3,381,186
BALANCED MULTIPLE CONTACT CONTROL ELECTRODE

Enno Arends, Belecke (Mohne), Germany, assignor to Licentia Patent-Verwaltungs-G.m.b.H., Frankfurt am Main, Germany Filed Mar. 19, 1965, Ser. No. 441,217
Claims priority, application Germany, Mar. 21, 1964, L 47,365
11 Claims. (Cl. 317—235)

ABSTRACT OF THE DISCLOSURE

Two or more spatially separated contact areas are provided on the body of a semiconductor thyristor for controlling the state thereof. Control pulses are simultaneously applied to the separated contact areas through a plurality of impedances each connected in series with a corresponding one of the contact areas. This simultaneously ignites all of the contact areas and produces an initial current distribution which is as close as possible to the steady state distribution.

The present invention relates to a semiconductor rectifier, and more particularly to a controllable semiconductor rectifier commonly known as a thyristor, which has a switching mode comparable to the thyrarton. The thyristor is commonly formed of a series of semiconductor regions of different conductivities, usually by joining several zones of semiconductor material in series so as to form at least three p-n junctions. A thyristor has three terminals; two primary terminals, one at the anode and one at the cathode, and a control electrode connected to one of the intermediate zones. Each of the two primary electrodes contacts the semiconductor body over a large area on the surface of the body. The source of of control current used to control the state of the thyristor may be connected between the control electrode and either of the two primary electrodes. In order to minimize the output requirements of the control source, as well as for other reasons, the control electrode may advantageously be connected to that semiconductor zone directly adjacent the zone to which the primary electrode is connected which provides one of the control terminals. The control electrode connection may be made on the same exterior surface of the semiconductor body to which the last-mentioned primary electrode is attached. In some thyristors, the control electrode is provided at the edge of the semiconductor surface where a primary electrode is attached, or within a recess in the primary electrode itself. In other conventional devices, the control electrode is connected around the primary electrode in the form of a ring or partial ring. Or it may be connected to the semiconductor at several points interiorly of the electrode, thus dividing up the primary electrode. The geometry of the semiconductor body must be such that the control electrode layer of semiconductor material is exposed to the primary electrode connection surface where the control electrode is to be connected. When the thyristor is switched to its conductive state, ignition initially takes place within the semiconductor material between the point where the control electrode is connected and the corresponding primary electrode. Thus, the total current through the device is confined to a relatively small region of the semiconductor body. By connecting the control electrode to several points on the semiconductor surface, this arc-through effect may to some extent be avoided. (However, this does not solve the problem, since the initial conditions for ignition are different in different regions of the semiconductor body, so that ignition is likely to start from only a single region, controlled by one of the contacts, before a sufficiently high ignition current exists in those portions of the semiconductor body controlled by the remainder of the contacts.) If ignition takes place through a relatively small volume of the semiconductor body, the current density will subsequently even out over the whole primary electrode connection surface to which it flows. This stabilization does not, however, occur instantaneously, since the current density distribution requires a finite time to reach the steady state. The current flowing through the device is determined by the applied voltage and the impedance, and thus substantially independent of the actual volume through which the current is flowing, e.g., current density distribution. Therefore, the current density is initially very high in the relatively narrow region through which the total current initially passes, and requires some time to achieve steady state conditions. Since the initial current surge is confined to a relatively small volume, the resistance heating generated thereby is so high that the unit can be destroyed.

It is therefore an object of the present invention to provide a thyristor in which the current distribution in the initial current surge is as close as possible to the steady state distribution.

It is a further object of the present invention to provide a thyristor wherein a plurality of paths is provided for the initial turn-on current surge.

These objects as well as others are provided according to the present invention, in which a thyristor is provided with a control electrode which contacts the semiconductor body of the thyristor in a plurality of spatially separated contact areas, there being a galvanic impedance in series with each contact area of said control electrode, so that the simultaneous application of the switching pulse to all of said contact areas through their respective resistors produces simultaneous initial currents through each of said areas.

Additional objects and advantages of the present invention will become apparent upon consideration of the following description when taken in conjunction with the accompanying drawing in which the single figure is a partial schematic perspective view of a thyristor provided with a control electrode according to the invention.

As shown in the figure, the thyristor 1 includes a metallic base plate 2, which is preferably made of molybdenum and which serves as one of the primary electrodes for the device. The semiconductor body itself is formed of a disc 3 of semiconductor material which includes the necessary p-n zones, between which lie the junctions. The semiconductor body 3 is soldered to the base plate 2. The other primary electrode is provided by a plate 4 soldered to the opposite side of the semiconductor body 3 from the base plate 2. The control electrode includes three contacts 5, 5' and 5'', distributed about the edge of the primary electrode 4 in edge recesses. One or more of the control contact areas might also be located at the edge of the primary electrode, or in recesses in the central region of electrode 4. The control electrode contacts may be viewed as dividing the semiconductor body into subzones, the current through each of which is controlled primarily by the associated contact area. The contact areas may alternatively be arranged in the form of a ring about the primary electrode, or in a recess within the electrode. The conductor 8 for the primary electrode 4 is shown schematically in the embodiment illustrated. The conductors for each contact area meet at the common junction 7, and resistors 6, 6', 6'' are connected between the junction 7 and each of the control contacts, respectively. The control generator 10 may be connected between terminal 9 and the junction 7. The resistors 6, 6′ and 6″ are designed so as to effect a voltage distribution across the semiconductor body from each control contact area such that the ignition conditions of all of the sub-zones are fulfilled at the same time. If the minimum ignition currents are different from one another for the various control contacts 5, 5′ and 5″, then resistors 6, 6′ and 6″ may be designed to have different values, so that when the control voltage is applied the initial surges in all of the sub-zones will occur simultaneously. In general, equal resistors can be connected in series. The value of the control current must be sufficiently high to assure ignition in all of the sub-zones. The control voltage supplied by the control source is slightly higher when resistors 6, 6′ and 6″ are in the circuit than without them. However, the control source used in conventional circuitry is usually sufficiently large, since a current limiting resistor is generally in a control circuit at any rate. Inductive elements, which may be cross-coupled to each other, may be used in place of or in addition to resistors 6, 6′ and 6″. The term "galvanic impedance" is used herein to refer to an impedance having only resistive and inductive components, or either of them. The ohmic and/or inductive impedance may be advantageously mounted inside the sealed housing of the semiconductor system, so that only a control terminal 7 is visible from the outside. However, if the resistors are located outside the thyristor housing, they may be interchanged conveniently.

In one embodiment of the invention, the resistors in series with the control contacts of the control electrode may be formed as part of the walls of the housing of the unit, or may be mounted on or within the housing wall.

To turn off the thyristor according to the invention, an extinguishing pulse may be applied simultaneously through all of the contact areas.

As has been seen, the present invention provides a solution to the above-stated problem of an unevenly distributed initial current surge through a thyristor.

It does this by providing a plurality of contact areas for the control electrode, so that the initial current density in the sub-zone controlled by any one of the starting contacts is less than the maximum initial current density which would be present if only one contact for the control electrode were used. In addition, the use of a plurality of control electrode contacts allows the current distribution to reach the steady state in a shorter time than it would take with only a single control electrode contact.

It will be understood that the above description of the present invention is susceptible to various modifications, changes, and adaptations, and the same are intended to be comprehended within the meaning and range of equivalents of the appended claims.

What is claimed is:

1. In a thyristor arrangement having a semiconductor thyristor body, the improvement comprising:

(a) means forming at least two spatially separated contact areas on said body for controlling the state thereof;

(b) a plurality of galvanic impedance means each connected to a respective one of said contact areas; and (c) means for simultaneously applying a control pulse through each of said impedance means to their respective contact areas.

2. A thyristor arrangement as defined in claim 1, wherein said galvanic impedance means have impedance values such that the ignition current in the semiconductor body started by said control pulse is substantially evenly distributed throughout said body.

3. A thyristor arrangement as defined in claim 2, wherein the impedance values of all of said impedance means are equal, so that the control current component through each of said control areas becomes sufficient to cause an ignition current to flow at the same time.

4. A thyristor arrangement as defined in claim 1, wherein said thyristor is provided within a sealed housing, and each of said impedance means is located within said housing.

5. A thyristor arrangement as defined in claim 1, wherein said thyristor is provided within a sealed housing, said impedance means being provided exteriorly of said housing so that they may be changed and replaced easily.

6. A thyristor arrangement as defined in claim 1, wherein said thyristor is provided within a sealed housing, and said impedance means constitute portions of said housing.

7. A thyristor arrangement as defined in claim 1, wherein said thyristor is provided within a sealed housing, said impedance means being mounted in the wall of said housing.

8. A thyristor arrangement as defined in claim 1, wherein said thyristor is provided within a sealed housing, said impedance means being mounted on the wall of said housing.

9. A thyristor arrangement as defined in claim 1, including means for providing an extinguishing pulse through each of said contact areas simultaneously for switching the thyristor off.

10. A thyristor arrangement as defined in claim 2, including a further resistor connected in series with all of said contact areas for limiting the control pulse current through said control electrode to a desired value.

11. A thyristor arrangement as defined in claim 3, including a further resistor connected in series with all of said contact areas for limiting the control pulse current through said control electrode to a desired value.

References Cited

UNITED STATES PATENTS

| | | | |
|---|---|---|---|
| 3,040,196 | 6/1962 | D'Asaro | 307—88.5 |
| 3,097,335 | 7/1963 | Schmidt | 321—45 |
| 3,160,800 | 12/1964 | Smart | 317—245 |
| 3,277,310 | 10/1966 | Schreiner | 307—88.5 |

JOHN W. HUCKERT, *Primary Examiner.*

R. F. SANDLER, *Assistant Examiner.*